US011265070B2

(12) United States Patent
Cheraghi et al.

(10) Patent No.: US 11,265,070 B2
(45) Date of Patent: Mar. 1, 2022

(54) BEAM SEARCH FOR PRECODER FOR CHANNEL STATE FEEDBACK

(71) Applicant: QUALCOMM Incorporated, San Diego, CA (US)

(72) Inventors: Parisa Cheraghi, San Diego, CA (US); Veljko Boljanovic, Los Angeles, CA (US); Anas Tom, La Jolla, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 16/749,575

(22) Filed: Jan. 22, 2020

(65) Prior Publication Data

US 2021/0226686 A1    Jul. 22, 2021

(51) Int. Cl.
*H04B 7/06* (2006.01)
*H04B 7/08* (2006.01)
*H04B 7/0456* (2017.01)
*H04L 27/26* (2006.01)
*H04B 17/318* (2015.01)
*H04L 5/00* (2006.01)

(52) U.S. Cl.
CPC .......... *H04B 7/088* (2013.01); *H04B 7/0456* (2013.01); *H04B 7/0626* (2013.01); *H04B 7/0639* (2013.01); *H04B 17/318* (2015.01); *H04L 5/0051* (2013.01); *H04L 27/2613* (2013.01); *H04L 27/2636* (2013.01)

(58) Field of Classification Search
CPC .... H04B 7/0626; H04B 7/0639; H04B 7/088; H04B 7/0456; H04B 17/318; H04B 7/0452; H04L 5/0051; H04L 27/2613; H04L 27/2626

USPC .......... 375/267, 295, 299, 347, 349
See application file for complete search history.

(56) References Cited

U.S. PATENT DOCUMENTS

| | | | |
|---|---|---|---|
| 10,404,339 B1* | 9/2019 | Nammi | H04B 7/0626 |
| 2008/0205537 A1* | 8/2008 | Kim | H04B 7/0408 375/267 |
| 2020/0045684 A1* | 2/2020 | Futaki | H04L 5/0032 |
| 2020/0107309 A1* | 4/2020 | Akoum | H04B 7/088 |
| 2020/0169306 A1* | 5/2020 | Kim | H04B 7/0617 |
| 2021/0075482 A1* | 3/2021 | Rahman | H04B 7/0639 |
| 2021/0099211 A1* | 4/2021 | Rahman | H04B 7/0626 |

* cited by examiner

*Primary Examiner* — Emmanuel Bayard
(74) *Attorney, Agent, or Firm* — Holland & Hart LLP

(57) ABSTRACT

Methods, systems, and devices for wireless communications are described. A user equipment (UE) may perform a digital simulation to determine a precoding matrix indicator (PMI) associated with a digital reception beam. A base station may send, to the UE, a reference signal. The UE may perform a coarse beam search on the reference signal using non-oversampled digital reception beams. The UE may measure the signal strength of the reference signal for each of the non-oversampled digital reception beams and select the non-oversampled digital reception beam with the strongest signal. The UE may perform a refined beam search procedure on the selected beam by using a set of oversampled digital reception beams which correspond to the selected non-oversampled digital reception beam. The UE may determine the PMI associated with the strongest oversampled digital reception beam and send the PMI in a report to the base station.

30 Claims, 11 Drawing Sheets

BEAM SEARCH FOR PRECODER FOR CHANNEL STATE FEEDBACK

FIELD OF TECHNOLOGY

The following relates generally to wireless communications and more specifically to beam search for precoder for channel state feedback (CSF).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station or other UEs using beamforming techniques. A UE may have multiple panels (e.g., antenna modules, antenna arrays) which are used to form a communication beam (e.g., a reception beam or transmission beam) to communicate with base stations or other UEs. As the number of antenna elements (e.g., in an antenna array) at a UE increase, selection of appropriate precoder information may become more difficult and computationally complex, which may result in increased latency and communication inefficiencies. Further, inaccurate selection of appropriate precoder information may lead to inaccurate feedback provided by the UE to a base station, resulting in unsuitable or subpar communication parameters being utilized by the UE or base station for subsequent communications.

SUMMARY

The described techniques relate to improved methods, systems, devices, and apparatuses that support beam search for precoder for channel state feedback (CSF). Generally, the described techniques allow a user equipment (UE) to determine precoder information (e.g., select a precoding matrix indicator (PMI)) using digital reception beams generated by the UE. For example, a base station may transmit a reference signal to the UE, and after reception of the reference signal, the UE may perform an initial beam search (e.g., a coarse beam search procedure (e.g., a beam estimation)) using non-oversampled digital reception beams. The UE may measure the signal quality (e.g., signal strength, received power) of the reference signal for each of the non-oversampled digital reception beams and select a non-oversampled digital reception beam based on the measurement (e.g., the UE may select the non-oversampled digital reception beam having the highest measured signal strength).

The UE may perform a second (e.g., refined) beam search procedure using a set of oversampled digital reception beams that correspond to the selected non-oversampled digital reception beam. As part of the refined beam search procedure, the UE may measure signal quality of the received reference signal for each of the oversampled digital reception beams and select the oversampled digital reception beam based on the measurements (e.g., the UE may select the oversampled digital reception beam having the highest measured signal strength). After selecting the oversampled digital reception beam, the UE may determine a PMI associated with the selected oversampled digital reception beam and transmit the PMI the base station.

A method of wireless communications at a UE is described. The method may include receiving, from a base station, a reference signal over a set of resources configured for channel state information, performing a first beam search procedure on the received reference signal using a first subset of digital reception beams of the UE, selecting a first digital reception beam from the first subset based on a result of the first beam search procedure, performing a second beam search procedure using a second subset of digital reception beams of the UE based on the selected first digital reception beam, the second subset of digital reception beams including one or more reception beams corresponding to the selected first digital reception beam, and determining, based on the second beam search procedure, a PMI for the UE, the PMI associated with a reception beam of the one or more reception beams.

An apparatus for wireless communications at a UE is described. The apparatus may include a processor, memory coupled with the processor, and instructions stored in the memory. The instructions may be executable by the processor to cause the apparatus to receive, from a base station, a reference signal over a set of resources configured for channel state information, perform a first beam search procedure on the received reference signal using a first subset of digital reception beams of the UE, select a first digital reception beam from the first subset based on a result of the first beam search procedure, perform a second beam search procedure using a second subset of digital reception beams of the UE based on the selected first digital reception beam, the second subset of digital reception beams including one or more reception beams corresponding to the selected first digital reception beam, and determine, based on the second beam search procedure, a PMI for the UE, the PMI associated with a reception beam of the one or more reception beams.

Another apparatus for wireless communications at a UE is described. The apparatus may include means for receiving, from a base station, a reference signal over a set of resources configured for channel state information, performing a first beam search procedure on the received reference signal using a first subset of digital reception beams of the UE, selecting a first digital reception beam from the first subset based on a result of the first beam search procedure, performing a second beam search procedure using a second subset of digital reception beams of the UE based on the selected first digital reception beam, the second subset of digital reception beams including one or more reception beams corresponding to the selected first digital reception beam, and determining, based on the second beam search procedure, a PMI for the UE, the PMI associated with a reception beam of the one or more reception beams.

A non-transitory computer-readable medium storing code for wireless communications at a UE is described. The code may include instructions executable by a processor to receive, from a base station, a reference signal over a set of resources configured for channel state information, perform a first beam search procedure on the received reference signal using a first subset of digital reception beams of the UE, select a first digital reception beam from the first subset based on a result of the first beam search procedure, perform a second beam search procedure using a second subset of digital reception beams of the UE based on the selected first digital reception beam, the second subset of digital reception beams including one or more reception beams corresponding to the selected first digital reception beam, and determine, based on the second beam search procedure, a PMI for the UE, the PMI associated with a reception beam of the one or more reception beams.

Some examples of the method, apparatuses, and non-transitory computer-readable medium described herein may further include operations, features, means, or instructions for transmitting a report to the base station, where the report includes the PMI associated with the reception beam.

In some examples of the method, apparatuses, and non-transitory computer-readable medium described herein, the report may be a CSF report.

Some examples of the method, apparatuses, and non-transitory computer-readable medium described herein may further include operations, features, means, or instructions for selecting the first subset of digital reception beams from a total number of digital reception beams supported by the UE.

Some examples of the method, apparatuses, and non-transitory computer-readable medium described herein may further include operations, features, means, or instructions for selecting the second subset of digital reception beams from a total number of digital reception beams supported by the UE, where each of the second subset of digital reception beams may be adjacent to the selected first digital reception beam.

In some examples of the method, apparatuses, and non-transitory computer-readable medium described herein, performing the first beam search procedure may include operations, features, means, or instructions for measuring signal strength of the received reference signal for each of the first subset of digital reception beams, where the result of the first beam search procedure may be based on the measured signal strength.

Some examples of the method, apparatuses, and non-transitory computer-readable medium described herein may further include operations, features, means, or instructions for selecting the first digital reception beam based on the measured signal strength.

In some examples of the method, apparatuses, and non-transitory computer-readable medium described herein, performing the second beam search procedure may include operations, features, means, or instructions for measuring signal strength of the second subset of digital reception beams, and selecting the reception beam from the one or more reception beams based on the measured signal strength.

Some examples of the method, apparatuses, and non-transitory computer-readable medium described herein may further include operations, features, means, or instructions for determining the PMI based on the reception beam.

In some examples of the method, apparatuses, and non-transitory computer-readable medium described herein, the first subset of digital reception beams and the second subset of digital reception beams include discrete Fourier transform (DFT) beams.

In some examples of the method, apparatuses, and non-transitory computer-readable medium described herein, the second subset of digital reception beams may have consecutive beam indices.

In some examples of the method, apparatuses, and non-transitory computer-readable medium described herein, the reference signal may be a channel state information reference signal (CSI-RS).

Some examples of the method, apparatuses, and non-transitory computer-readable medium described herein may further include operations, features, means, or instructions for selecting the first subset of digital reception beams and the second subset of digital reception beams based on a precoding codebook.

DETAILED DESCRIPTION

Figure 1:
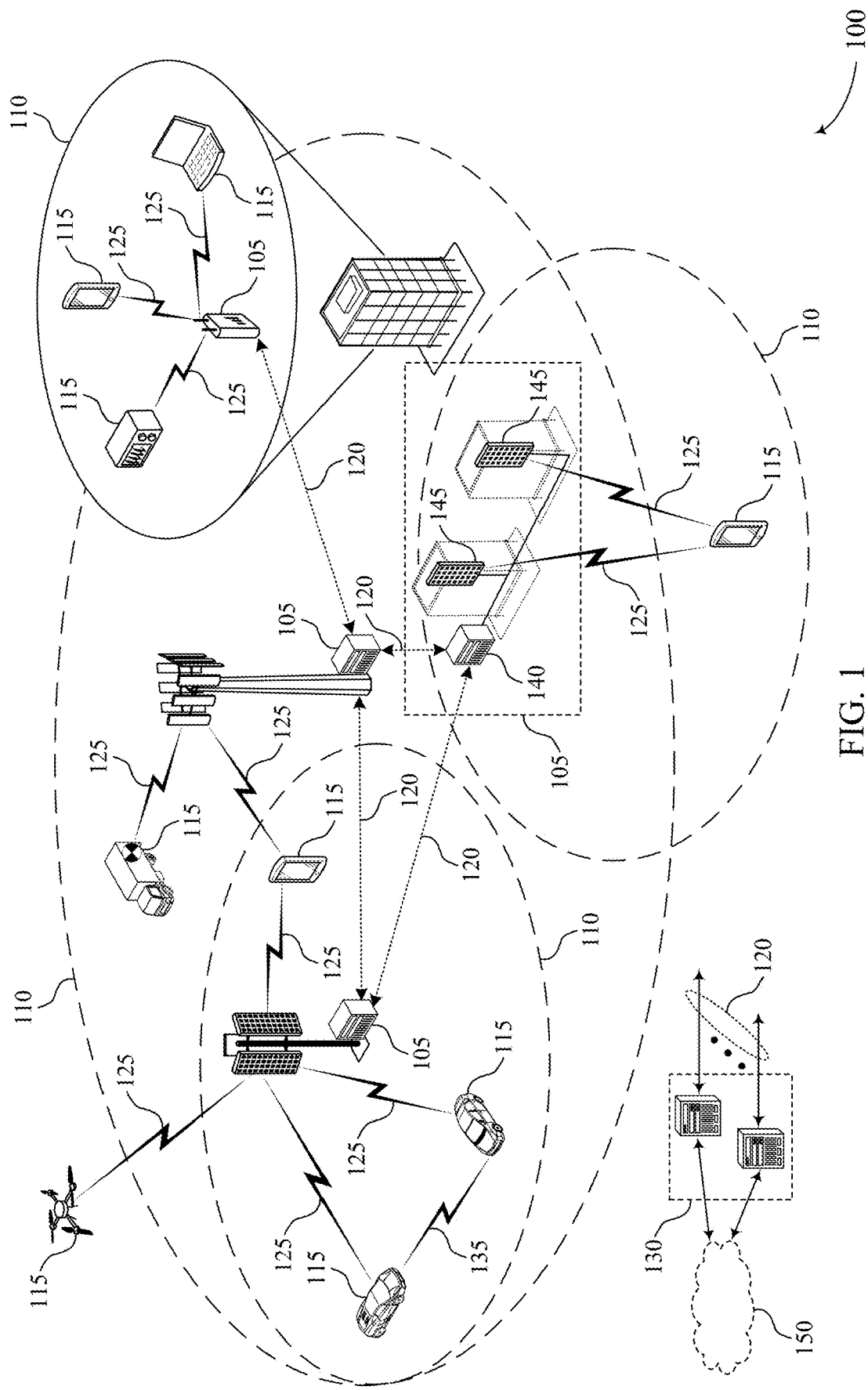
FIG. 1 illustrates an example of a wireless communications system that supports beam search for precoder for channel state feedback (CSF) in accordance with aspects of the present disclosure.

A user equipment (UE) may have multiple antenna panels (e.g., antenna modules, antenna arrays) which are used to form a communication beam (e.g., a reception beam or transmission beam) to communicate with a base station using beamforming techniques. As the number of antennas at a UE increases, the time and complexity for determining precoder information for channel feedback may increase, which may cause delays at the UE in providing accurate feedback to the base station. According to some aspects, the UE may perform multiple beam search procedures to determine a precoding matrix indicator (PMI) associated with a digital reception beam. The multiple beam search procedures may include a coarse beam search procedure and a refined beam search procedure, and may reduce the complexity and latency for determining PMI by the UE and providing accurate feedback (e.g., channel state information (CSI)) to the base station.

In some examples, the UE may perform a digital analysis or simulation to determine the precoder information (e.g., PMI) associated with a digital reception beam (e.g., discrete Fourier transform (DFT) beams) appropriate for communications between the UE and the base station. For instance, the UE may select a digital reception beam from a set of digital reception beams based on a measured signal strength of a reference signal for each of the set of digital reception beams, and determine a corresponding PMI for feedback according to the selected digital reception beam. According to some aspects, a base station may transmit a reference signal (e.g., channel state information (CSI) reference signal (CSI-RS)) to the UE and the UE may perform (e.g., digitally perform) a coarse beam search procedure (e.g., beam estimation) on the CSI-RS using digital reception beams (e.g., non-oversampled digital reception beams). The UE may measure the signal strength of the CSI-RS for each of the non-oversampled digital reception beams and select a non-oversampled digital reception beam associated with the highest signal quality (highest measured signal strength or receive power, lowest interference, etc.).

Based on the selected non-oversampled digital reception beam, the UE may perform a second beam search procedure (e.g., a refined beam search procedure) using a set of oversampled digital reception beams that correspond to the non-oversampled digital reception beams. The refined beam search may include measuring the signal strength of the received reference signal for each of the set of oversampled digital reception beams and identifying or determining the oversampled digital reception beam with the highest signal quality (highest measured signal strength or receive power, lowest interference, etc.). The UE may determine precoder information such as the PMI associated with the determined oversampled digital reception beam and transmit the PMI in a report (e.g., channel state feedback (CSF) report) to the base station. The base station may use the PMI for determining beam parameters such as reception or transmission beam index, reception or transmission beam width, etc. for beamforming communications between the UE and the base station.

Particular aspects of the subject matter described herein may be implemented to realize one or more advantages. The described techniques may support improvements in determining a PMI for channel feedback such as by reducing the complexity and latency at the UE as part of the determination of the PMI, which may reduce power consumption at the UE and improve communication efficiency, among other advantages. As such, supported techniques may include improved network operations and, in some examples, may promote network efficiencies, among other benefits.

Aspects of the disclosure are initially described in the context of wireless communications systems. Additionally, aspects of the disclosure are illustrated through examples of digital reception beam systems and a process flow. Aspects of the disclosure are further illustrated by and described with reference to apparatus diagrams, system diagrams, and flowcharts that relate to beam search for precoder for CSF.

FIG. 1 illustrates an example of a wireless communications system 100 that supports beam search for precoder for CSF in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, such as in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

UE 115 may perform a digital analysis of multiple reception beams to determine a PMI associated with a digital reception beam. Base station 105 may transmit, to the UE 115, a reference signal and the UE 115 may perform a coarse beam search procedure (e.g., beam estimation) on the reference signal using non-oversampled digital reception beams, which may be generated digitally by the UE based on the number of antenna panels, antenna elements, etc. The UE 115 may measure the signal quality of the reference signal for each of the non-oversampled digital reception beams and select the non-oversampled digital reception beam based on the signal quality. The UE 115 may perform a refined beam search procedure on the selected beam by using a set of oversampled digital reception beams which correspond to the selected non-oversampled digital reception beam. The refined beam search may include measuring the signal quality of the set of oversampled digital reception beams to identify an oversampled digital reception beam based on the signal quality. The UE 115 may determine the PMI associated with the selected oversampled digital reception beam and transmit the PMI in a report to the base station 105.

Figure 2:
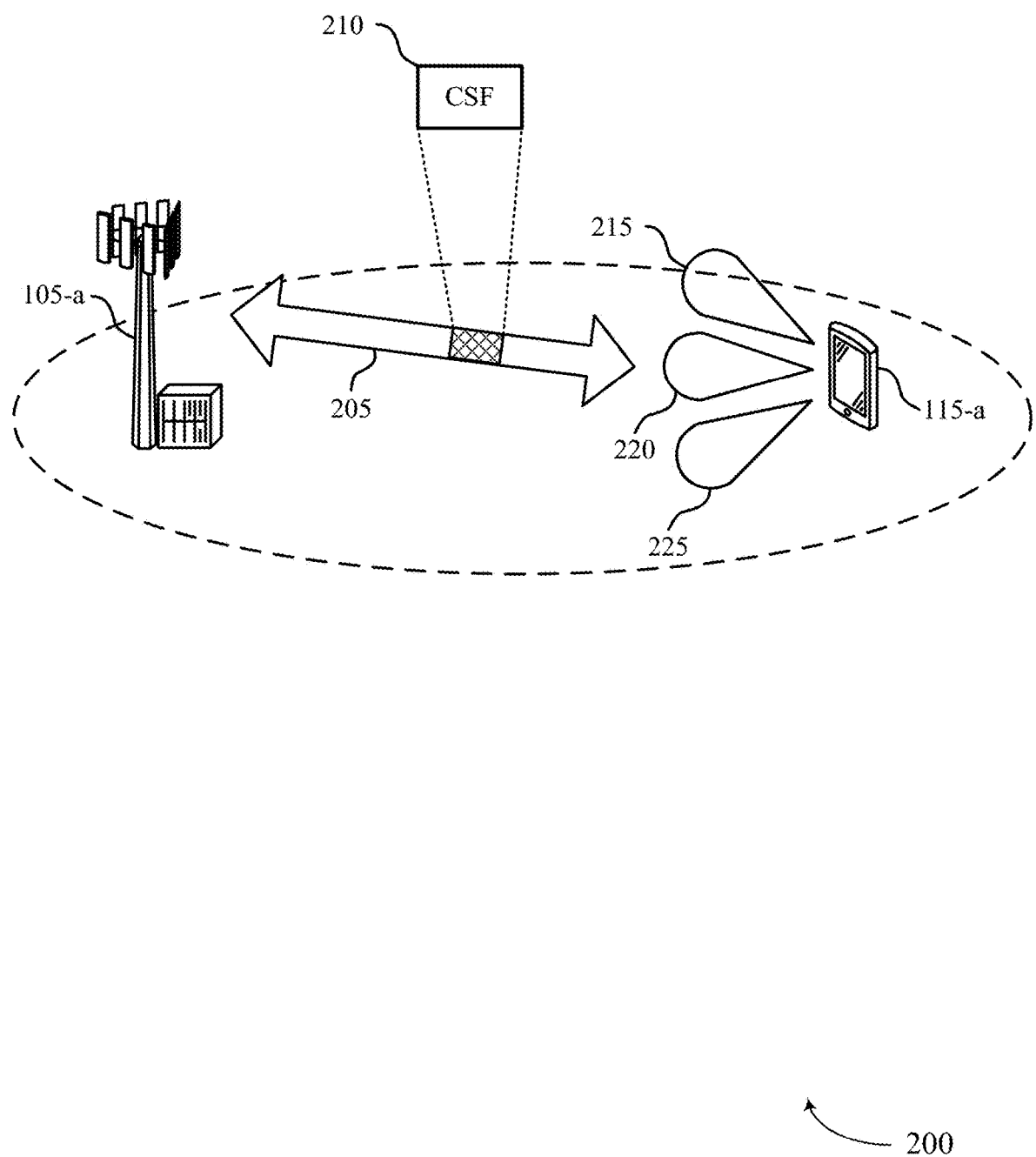
FIG. 2 illustrates an example of a wireless communications system that supports beam search for precoder for CSF in accordance with aspects of the present disclosure.

FIG. 2 illustrates an example of a wireless communications system 200 that supports beam search for precoder for CSF in accordance with aspects of the present disclosure. In some examples, wireless communications system 200 may implement aspects of wireless communications system 100. Wireless communications system 200 may include a base station 105-a and a UE 115-a, which may be examples of the corresponding devices as described herein with reference to FIG. 1.

In some cases, UE 115-a and base station 105-a may communicate using resources of a communication link 205. Additionally, or alternatively, the communications on communication link 205 may be performed using beamforming techniques such as beamformed transmissions as described herein with reference to FIG. 1.

UE 115-a may receive transmissions (e.g., CSI-RS) from base station 105-a via reception beams 215, 220, and 225. UE 115-a may perform a digital simulation with a dual stage DFT beam search to determine a PMI to use for future communications with the base station 105-a. The PMI may indicate to base station 105-a the reception beams corresponding to the highest signal quality at the UE 115-a, which may be used by the base station 105-a to select transmission beams for use by the base station 105-a in subsequent communications. For instance, the base station 105-a may identify or select transmission beams that maximize the transmission energy received via reception beams 215, 220, or 225.

As the number of antennas at UE 115-a increase, the delta between selecting appropriate versus unsuitable precoder information increases as well. The main complexity of feedback (e.g., CSI) in this scenario is a result of the complexity for determining PMI determination, where a majority (e.g., up to 75% or more) of the overall feedback complexity is consumed for PMI selection. As the number of antennas increases, the size of the codebook at the UE 115-a also increases, which introduces complexity in selection of $W_1$ as part of the PMI determination. That is, a larger codebook size increases the complexity when selecting $W_1$ as part of the PMI determination.

The precoding matrix for Type I single panel codebook may be represented by Equation 1 as follows:

$$W = \frac{1}{\sqrt{2\upsilon N_1 N_2}} \begin{bmatrix} w_{0,0} & w_{0,1} & \cdots & w_{0,\upsilon-1} \\ w_{1,0} & w_{1,1} & \cdots & w_{1,\upsilon-1} \end{bmatrix}$$

In Equation 1, $\upsilon$ denotes the layers and based on the rank and the number of CSI-RS ports, the following of Table 1 apply:

TABLE 1

| RANK | | $w_{r,\upsilon}$ |
|---|---|---|
| 3/4 | 1 | $b_{k_1, k_2} \times c_{r, \upsilon}$ |
| | 2 | $b_{k_1+k'_1, k_2+k'_2, l} \times c_{r, \upsilon}$ |
| | $N_{Tx} < 16$ | $b_{k_1+k'_1, k_2+k'_2, l} \times c_{r, \upsilon}$ |
| | $N_{Tx} \geq 16$ | |
| | | $b'_{k_1, k_2} \times c_{r, \upsilon}$ |
| | | $\Psi_{m, l} b'_{k_1, k_2}$ |

In Table 1, $b_{k_1,k_2}'$ is an oversampled 2D DFT beam of length $$\frac{N_1}{2} N_2,$$

while $b_{k_1+k_{1,l}', k_2+k_{2,l}'}$ and $b_{k_1,k_2}$ have a length $N_1 N_2$, $c_{r,\upsilon}$ is the cophasing coefficient between polarization, and $\psi_{m,l}$ is the cophasing coefficient between antenna groups.

The precoding matrix for Type II codebook per subband, W, may be represented as $$W = \begin{bmatrix} \tilde{w}_{0,0} \\ \tilde{w}_{1,0} \end{bmatrix} \text{ and } W = \begin{bmatrix} \tilde{w}_{0,0} & \tilde{w}_{0,1} \\ \tilde{w}_{1,0} & \tilde{w}_{1,1} \end{bmatrix}$$

for rank 1 and 2 respectively, where $\tilde{w}_{r,l} = \Sigma_{i=0}^{L-1} \upsilon_{k_1^{(i)} k_2^{(i)}} \cdot p_{r,l,i}^{(WB)} \cdot p_{r,l,i}^{(SB)} \cdot c_{r,l,i}$, and where $\upsilon_{k_1,k_2}$ is an oversampled 2D DFT beam, r=0, 1 (representing polarization), l=0, 1 (representing layers), $p_{r,l,i}^{(WB)}$ wideband (WB) beam amplitude scaling factor (which may include 3 bits), $p_{r,l,i}^{(SB)}$ subband (SB) beam amplitude scaling factor (which may include 1 bit), and $c_{r,l,i}$ beam combining coefficient (which may be a configurable number of 2 or 3 bits).

Based on the above, Type II can be denoted in a more general form as $W = W_1 W_2$ where $W_1$ has size $2N_1 N_2 \times L$, and may be used to capture long-term or wideband properties of the channel, which may be common between different layers, polarizations, or subbands. $W_1$ may be represented by Equation 2 as follows:

$$\tilde{w}_1 = \sum_{i=0}^{L-1} v_{k_1^{(i)} k_2^{(i)}}$$

$W_2$ with size L×1 may denote the linear transformation matrix capturing the shorter-term subband properties of the channel and may be represented by Equation 3 as follows:

$$\tilde{w}_{2,r,l} = \sum_{i=0}^{L-1} p_{r,l,i}^{(SB)} \cdot p_{r,l,i}^{(WB)} \cdot c_{r,l,i}$$

Based on the codebook structure outline and illustrated by Equations 1, 2, and 3, which may be further extended to multiple panel configurations, the initial stage of precoder selection utilize DFT beam selection. Further, the spectral efficiency (SE) metric computation may be represented by Equation 4 below:

$$M_i(m) = (v_m^*) \overline{C}_i(v_m), \forall m$$

In some cases, the SE metric computation may consume a majority of the overall $W_1$ selection cycles (e.g., more than 65% in a 32 antenna port configuration and more than 50% in an 8 antenna port configuration) because all DFT hypothesis are tested. Further, $W_1$ selection itself consumes a greater portion of the overall cycles used for generating CSF for high dimension antenna configurations (i.e., as the number of antennas increase at the UE 115-a).

To improve CSF generation and PMI selection, aspects of the disclosure provide a dual stage DFT search where a first stage includes a coarse search is performed based on non-oversamples DFT beam indices and a second stage includes an exhaustive search performed only in the dominant direction selected as part of the first stage. Such techniques may reduce the complexity of the DFT search compared to traditional DFT search procedures, as shown in the example complexity reduction table below.

TABLE 2

| Number of CSI-RS ports | ($N_1$, $N_2$) | ($O_1$, $O_2$) | Traditional number of hypothesis | Reduced number of hypothesis | Search reduction |
|---|---|---|---|---|---|
| 4 | (2, 1) | (4, —) | 8 | 6 | 25% |
| 8 | (2, 2) | (4, 4) | 64 | 12 | 81% |
|  | (4, 1) | (4, —) | 16 | 8 | 50% |
| 12 | (3, 2) | (4, 4) | 96 | 14 | 85% |
|  | (6, 1) | (4, —) | 24 | 10 | 58% |
| 16 | (4, 2) | (4, 4) | 128 + 64 | 16 + 12 | 86% |
|  | (8, 1) | (4, —) | 32 + 16 | 12 + 8 | 58% |
| 24 | (6, 2), (4, 3) | (4, 4) | 192 + 96 | 20 + 14 | 88% |
|  | (12, 1) | (4, —) | 48 + 24 | 16 + 10 | 64% |
| 32 | (8, 2), (4, 4) | (4, 4) | 256 + 128 | 24 + 16 | 90% |
|  | (16, 1) | (4, —) | 64 + 32 | 20 + 12 | 67% |

According to some aspects, in the first stage, UE 115-a performs a coarse beam search on non-oversampled digital reception beam indices using a reference signal received from the base station 105-a. The coarse beam search may be used to narrow down the spatial direction in which the dominant reception beams are located (e.g., the digital beams). In the second stage, UE 115-a performs a refined beam search on oversampled digital reception beams in the direction of the dominant non-oversampled digital reception beam(s). Based on the refined beam search, UE 115-a may determine the PMI associated with an oversampled beam which is in the direction associated with the strongest signal from base station 105-a. UE 115-a may send the PMI in CSF report 210 to base station 105-a. In some examples, the CSF report 210 may include the channel quality index (CQI) or the rank indication (RI).

Figure 3A:
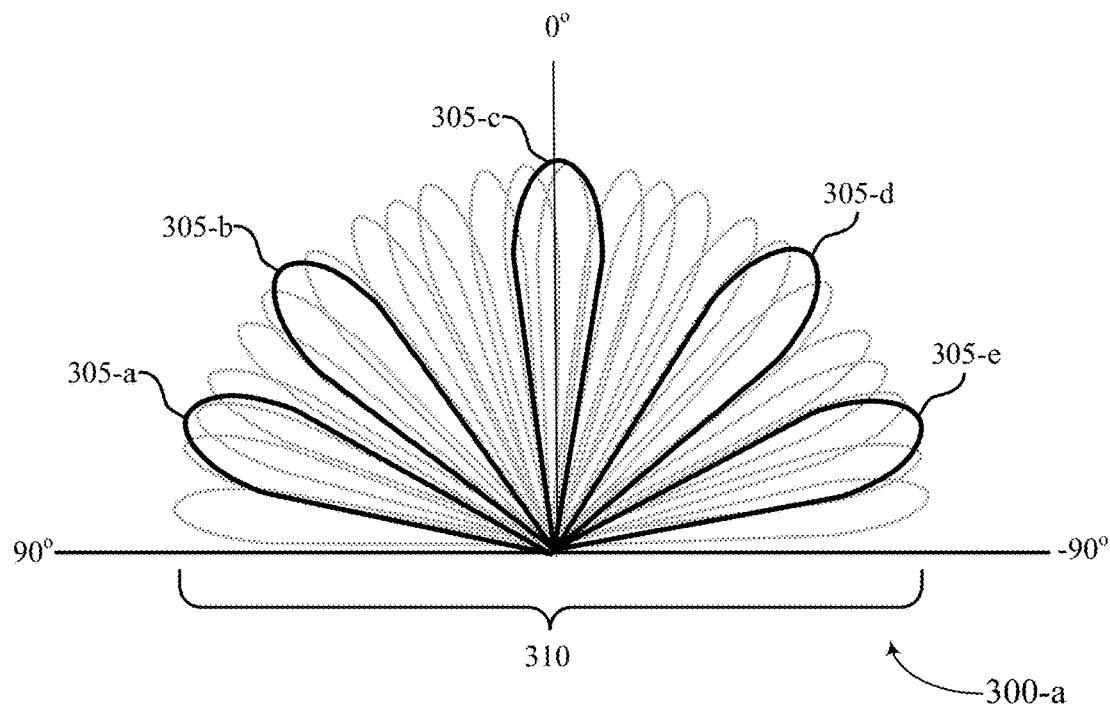
FIGS. 3A and 3B illustrate example digital reception beam systems that support beam search for precoder for CSF in accordance with aspects of the present disclosure.

FIG. 3A illustrates an example of digital reception beam plot 300-a that supports beam search for precoder for CSF in accordance with aspects of the present disclosure. In some examples, digital reception beam plot 300-a may implement aspects of wireless communications systems 100 or 200.

As illustrated in digital reception beam plot 300-a, a UE may perform a digital analysis using multiple digital reception beams, such as non-oversampled digital reception beams 305, to determine PMI for the UE. A UE may generate a set of digital reception beams 310, each of which may be a digital representation of an antenna configuration for a given reception beam at the UE and may correspond to a given beam direction. After receiving a signal from the base station, such as a CSI-RS or other signal, the UE may perform a coarse beam search using the non-oversampled digital reception beams 305 (which may be a subset of the set of digital reception beams 310), and may measure the received signal at each of the non-oversampled digital reception beams 305. In some examples, the non-oversampled digital reception beams 305 have non-consecutive beam indices. Based on the measurements, the UE may select a non-oversampled digital reception beam 305 for performing a refined beam search procedure (e.g., the UE may select non-oversampled digital reception beam 305-b, which corresponds to the highest signal quality or other parameter to maximize the energy of the received signal).

Figure 3B:
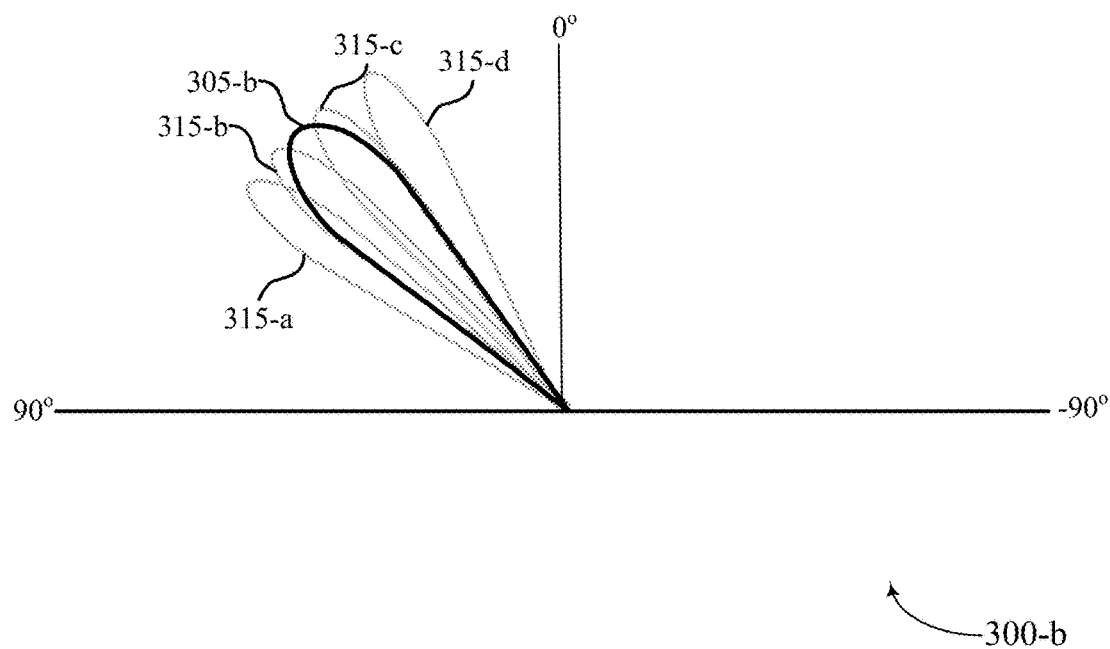

FIG. 3B illustrates an example of digital reception beam plot 300-b that supports beam search for precoder for CSF in accordance with aspects of the present disclosure. In some examples, digital reception beam plot 300-b may implement aspects of wireless communications systems 100 or 200.

As illustrated in digital reception beam plot 300-b, a UE may perform a digital analysis using multiple digital reception beams, such as oversampled digital reception beams 310, to determine PMI for the UE. For example, a UE may generate a set of digital reception beams 310, each of which may be a digital representation of an antenna configuration for a given reception beam at the UE and may correspond to a given beam direction. After selecting a non-oversampled digital reception beam for performing a refined beam search procedure (e.g., the UE may select non-oversampled digital reception beam 305-b, which corresponds to the highest signal quality or other parameter to maximize the energy of the received signal), as described with respect to FIG. 3A, the UE may perform a refined beam search in direction of beam 305 to determine an oversampled digital reception beam 305 for which to use for the determination of PMI. The UE may perform a refined digital reception beam search using oversampled digital reception beams 315-a, 315-b, 315-c, and 315-d, each of which correspond to the non-oversampled digital reception beam 305-b selected as part of the coarse beam search described in FIG. 3A. In some examples, oversampled digital reception beams 315-a, 315-b, 315-c, and 315-d may have consecutive beam indices and the UE may measure the received signal using each of oversampled digital reception beams 315-a, 315-b, 315-c, and 315-d. Based on the measurements, the UE may select an oversampled digital reception beam, such as oversampled digital reception beam 315-*d*, which may be associated with the highest signal quality (e.g., highest signal strength, highest received power). The UE may then use the selected oversampled digital reception beam 315-*d* to determine PMI, which may be sent to a base station in a CSF report.

Figure 4:
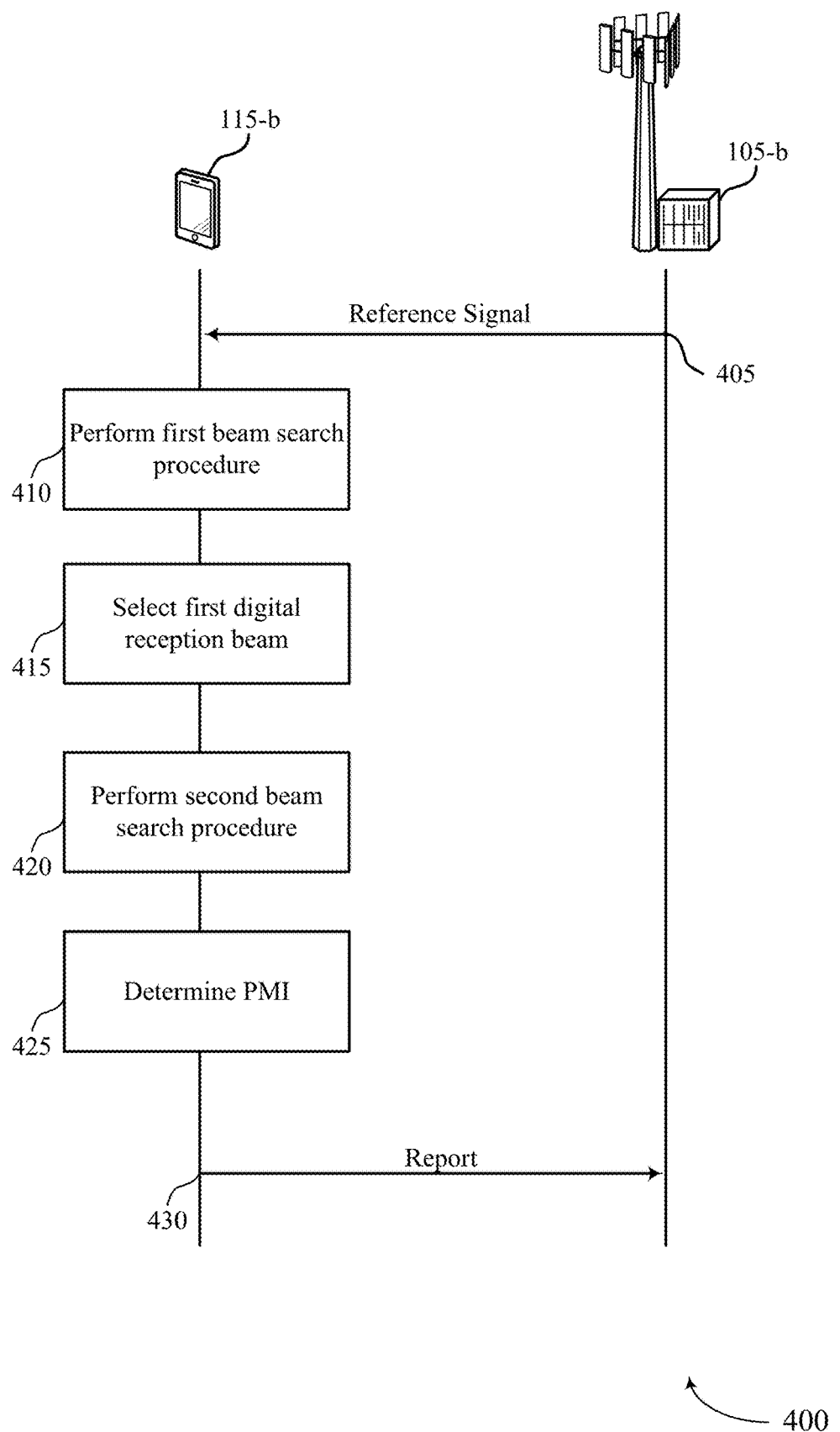
FIG. 4 illustrates an example of a process flow that supports beam search for precoder for CSF in accordance with aspects of the present disclosure.

FIG. 4 illustrates an example of a process flow 400 that supports beam search for precoder for CSF in accordance with aspects of the present disclosure. In some examples, process flow 400 may implement aspects of wireless communications systems 100 or 200.

At 405, base station 105-*b* may transmit, to UE 115-*b*, a reference signal (e.g., CSI-RS) over a set of resources configured for a CSI.

At 410, UE 115-*b* may perform a first beam search procedure (e.g., coarse beam search procedure) on the received reference signal using a first subset of digital reception beams (e.g., including DFT beams) of the UE 115-*b*. The first beam search procedure may include UE 115-*b* measuring signal strength of the received reference signal for each of the first subset of digital reception beams, where the result of the first beam search procedure is based on the measured signal strength. In some examples, UE 115-*b* may select the first subset of digital reception beams from a total number of digital reception beams supported by the UE 115-*b*.

At 415, UE 115-*b* may select a first digital reception beam from the first subset based on a result of the first beam search procedure. In some cases, UE 115-*b* may select a first digital reception beam based on the measured signal strength.

At 420, UE 115-*b* may perform a second beam search procedure (e.g., a refined beam search procedure) using a second subset of digital reception beams (e.g., including DFT beams) of the UE 115-*b* based on the selected first digital reception beam, where the second subset of digital reception beams may include one or more reception beams corresponding to the selected first digital reception beam. In some examples, the second subset of digital reception beams have consecutive beam indices. The second beam search procedure may include UE 115-*b* measuring signal strength of the second subset of digital reception beams and selecting the reception beam from the one or more reception beams based on the measured signal strength. In some examples, UE 115-*b* may select the second subset of digital reception beams from a total number of digital reception beams supported by the UE 115-*b*, where each of the second subset of digital reception beams may be adjacent to the selected first digital reception beam.

At 425, UE 115-*b* may determine, based on the second beam search procedure, a PMI for the UE 115-*b*, the PMI associated with a digital reception beam of the one or more digital reception beams. In some examples, UE 115-*b* may determine the PMI based on the digital reception beam.

At 430, UE 115-*b* may transmit, to the base station 105-*b*, a report (e.g., CSF report) including the PMI associated with the selected digital reception beam.

Figure 5:
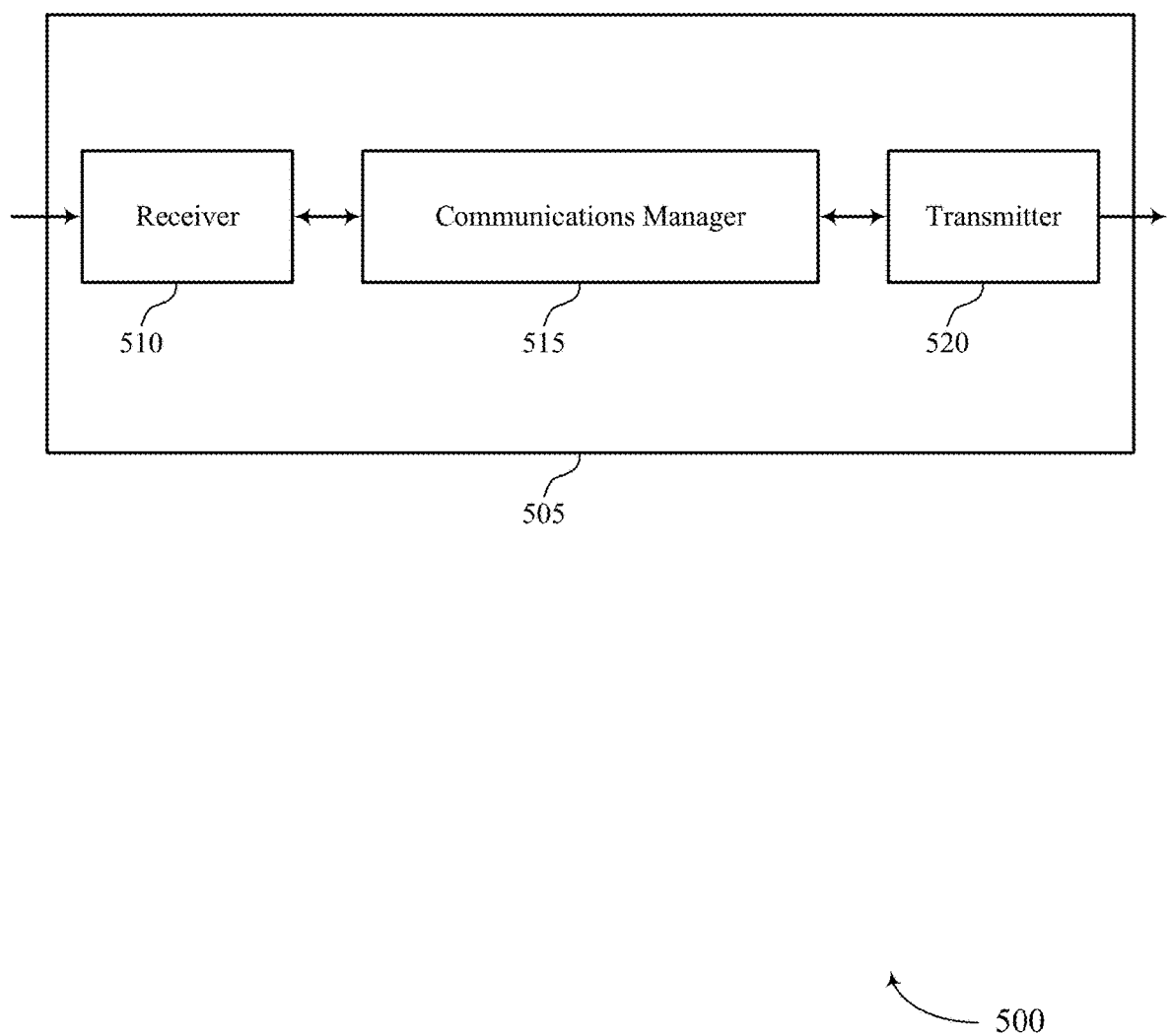
FIGS. 5 and 6 show block diagrams of devices that support beam search for precoder for CSF in accordance with aspects of the present disclosure.

FIG. 5 shows a block diagram 500 of a device 505 that supports beam search for precoder for CSF in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to beam search for precoder for CSF, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a reference signal over a set of resources configured for channel state information, perform a first beam search procedure on the received reference signal using a first subset of digital reception beams of the UE, perform a second beam search procedure using a second subset of digital reception beams of the UE based on the selected first digital reception beam, the second subset of digital reception beams including one or more reception beams corresponding to the selected first digital reception beam, select a first digital reception beam from the first subset based on a result of the first beam search procedure, and determine, based on the second beam search procedure, a PMI for the UE, the PMI associated with a reception beam of the one or more reception beams. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to perform beam search procedures and determine a PMI associated with a digital reception beam in an efficient manner. Determining the PMI associated with a selected digital reception beams using a reduced number of DFT hypothesis may reduce the latency and complexity of the PMI determination, thereby increasing communication efficiency while maintaining accurate beamforming parameters for communications.

Based on techniques for determining a PMI associated with reception beams as described herein, a processor of a UE 115 (e.g., controlling the receiver 510, the transmitter 520, or the transceiver 820 as described with reference to FIG. 8) may increase reliability and decrease signaling overhead in the communications because the UE 115 may avoid going through unnecessary computations processes during beamformed communications, which may reduce power consumption at the device 505.

Figure 6:
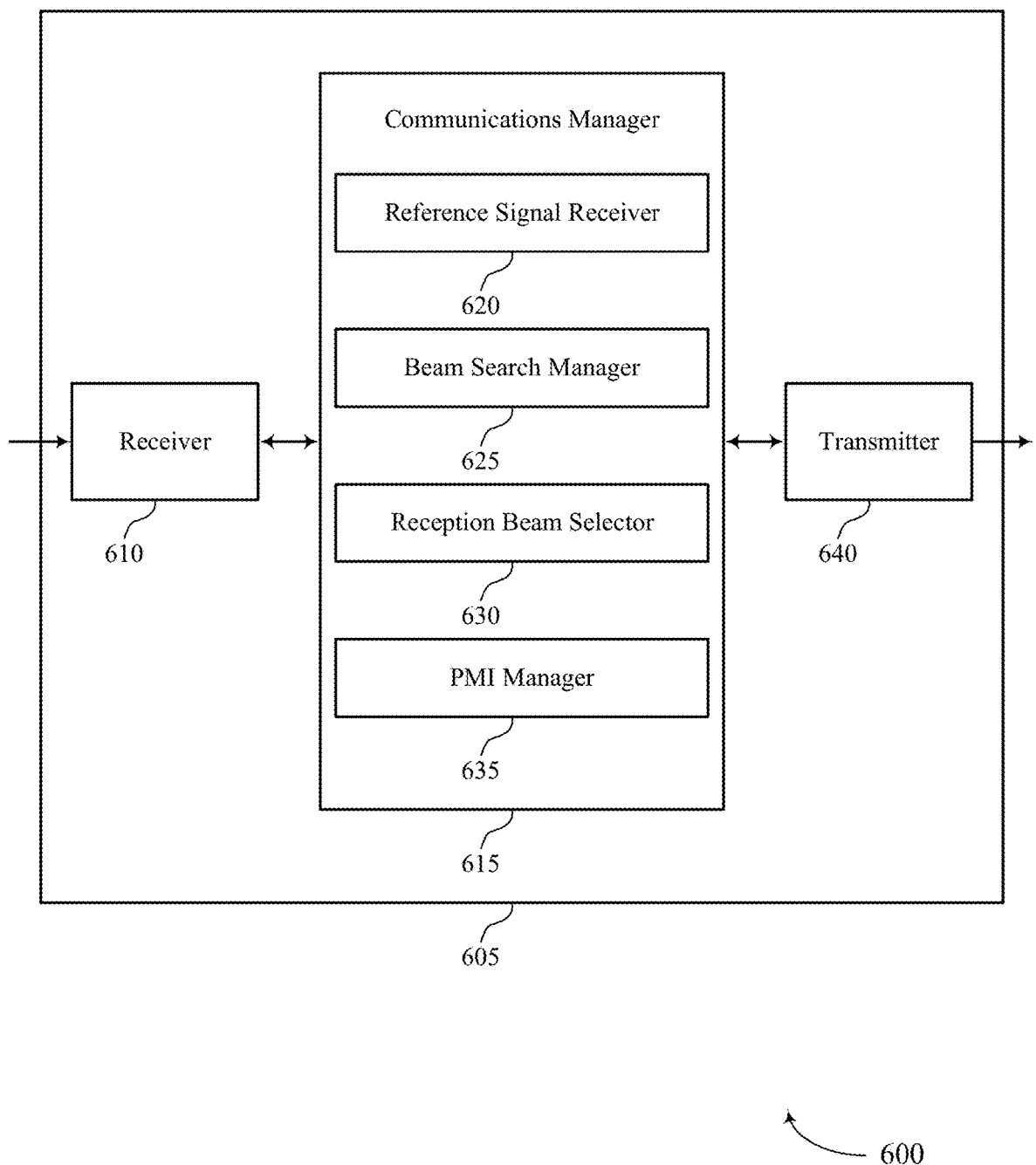

FIG. 6 shows a block diagram 600 of a device 605 that supports beam search for precoder for CSF in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to beam search for precoder for CSF, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a reference signal receiver 620, a beam search manager 625, a reception beam selector 630, and a PMI manager 635. The communications manager 615 may be an example of aspects of the communications manager 810 described herein.

The reference signal receiver 620 may receive, from a base station, a reference signal over a set of resources configured for channel state information.

The beam search manager 625 may perform a first beam search procedure on the received reference signal using a first subset of digital reception beams of the UE and perform a second beam search procedure using a second subset of digital reception beams of the UE based on the selected first digital reception beam, the second subset of digital reception beams including one or more reception beams corresponding to the selected first digital reception beam.

The reception beam selector 630 may select a first digital reception beam from the first subset based on a result of the first beam search procedure.

The PMI manager 635 may determine, based on the second beam search procedure, a PMI for the UE, the PMI associated with a reception beam of the one or more reception beams.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
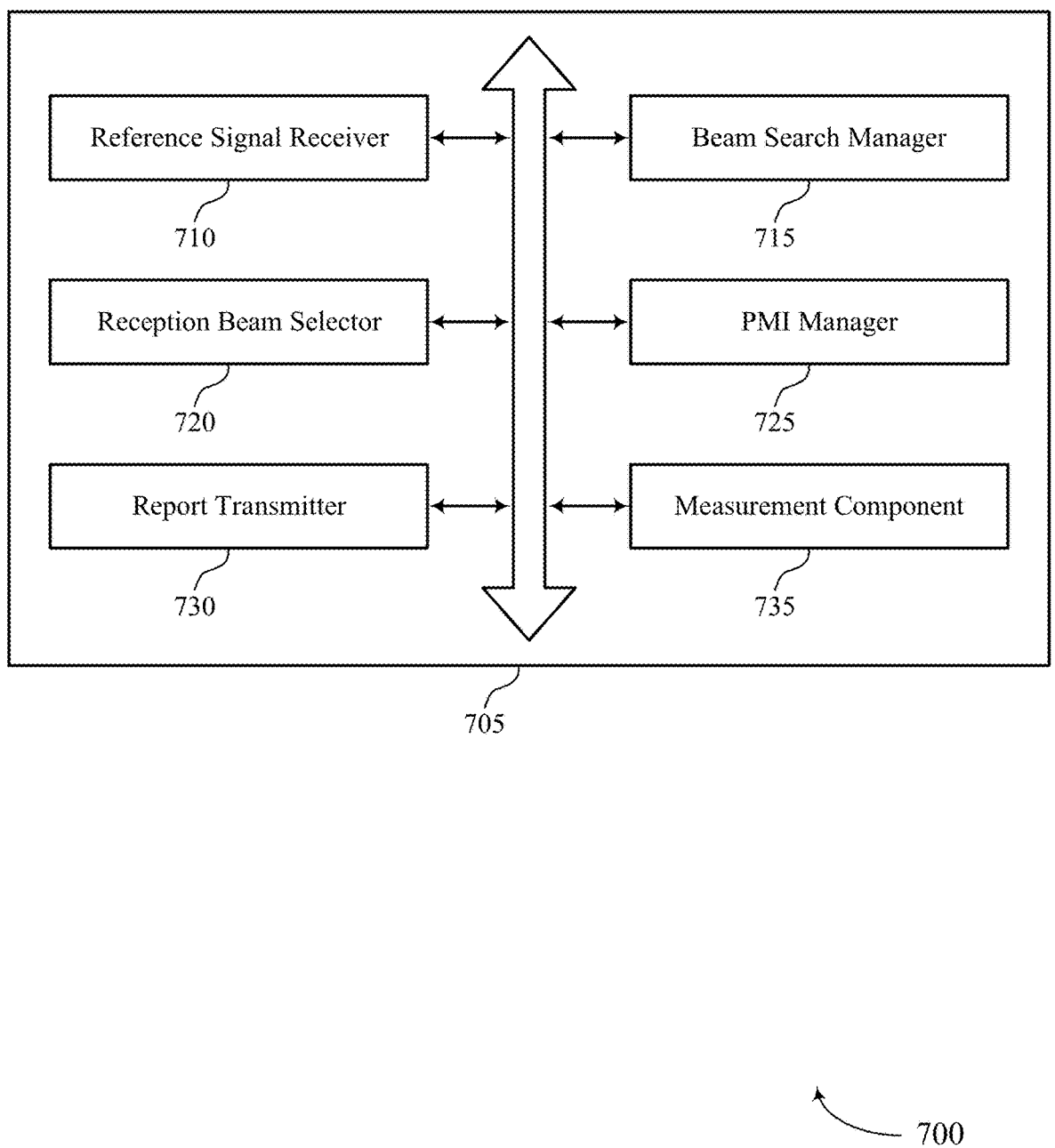
FIG. 7 shows a block diagram of a communications manager that supports beam search for precoder for CSF in accordance with aspects of the present disclosure.

FIG. 7 shows a block diagram 700 of a communications manager 705 that supports beam search for precoder for CSF in accordance with aspects of the present disclosure. The communications manager 705 may be an example of aspects of a communications manager 515, a communications manager 615, or a communications manager 810 described herein. The communications manager 705 may include a reference signal receiver 710, a beam search manager 715, a reception beam selector 720, a PMI manager 725, a report transmitter 730, and a measurement component 735. Each of these modules may communicate, directly or indirectly, with one another (e.g., via one or more buses).

The reference signal receiver 710 may receive, from a base station, a reference signal over a set of resources configured for CSI. In some cases, the reference signal is a CSI-RS.

The beam search manager 715 may perform a first beam search procedure on the received reference signal using a first subset of digital reception beams of the UE. In some examples, the beam search manager 715 may perform a second beam search procedure using a second subset of digital reception beams of the UE based on the selected first digital reception beam, the second subset of digital reception beams including one or more reception beams corresponding to the selected first digital reception beam.

The reception beam selector 720 may select a first digital reception beam from the first subset based on a result of the first beam search procedure. In some examples, the reception beam selector 720 may select the first subset of digital reception beams from a total number of digital reception beams supported by the UE. In some cases, the reception beam selector 720 may select the second subset of digital reception beams from a total number of digital reception beams supported by the UE, where each of the second subset of digital reception beams are adjacent to the selected first digital reception beam. In some instances, the reception beam selector 720 may select the first digital reception beam based on the measured signal strength. In some aspects, the reception beam selector 720 may select the reception beam from the one or more reception beams based on the measured signal strength. The reception beam selector 720 may select the first subset of digital reception beams or the second subset of digital reception beams based on a precoding codebook (a precoding codebook configured for the UE, a predefined precoding codebook, a precoding codebook for a set of standards, etc.).

In some examples, the first subset of digital reception beams and the second subset of digital reception beams include DFT beams. In some cases, the second subset of digital reception beams have consecutive beam indices.

The PMI manager 725 may determine, based on the second beam search procedure, a PMI for the UE, the PMI associated with a reception beam of the one or more reception beams.

The report transmitter 730 may transmit a report to the base station, where the report includes the PMI associated with the reception beam. In some cases, the report is a CSF report.

The measurement component 735 may measure signal strength of the received reference signal for each of the first subset of digital reception beams, where the result of the first beam search procedure is based on the measured signal strength. In some examples, the measurement component 735 may measure signal strength of the second subset of digital reception beams. In some cases, the measurement component 735 may determine the PMI based on the reception beam.

Figure 8:
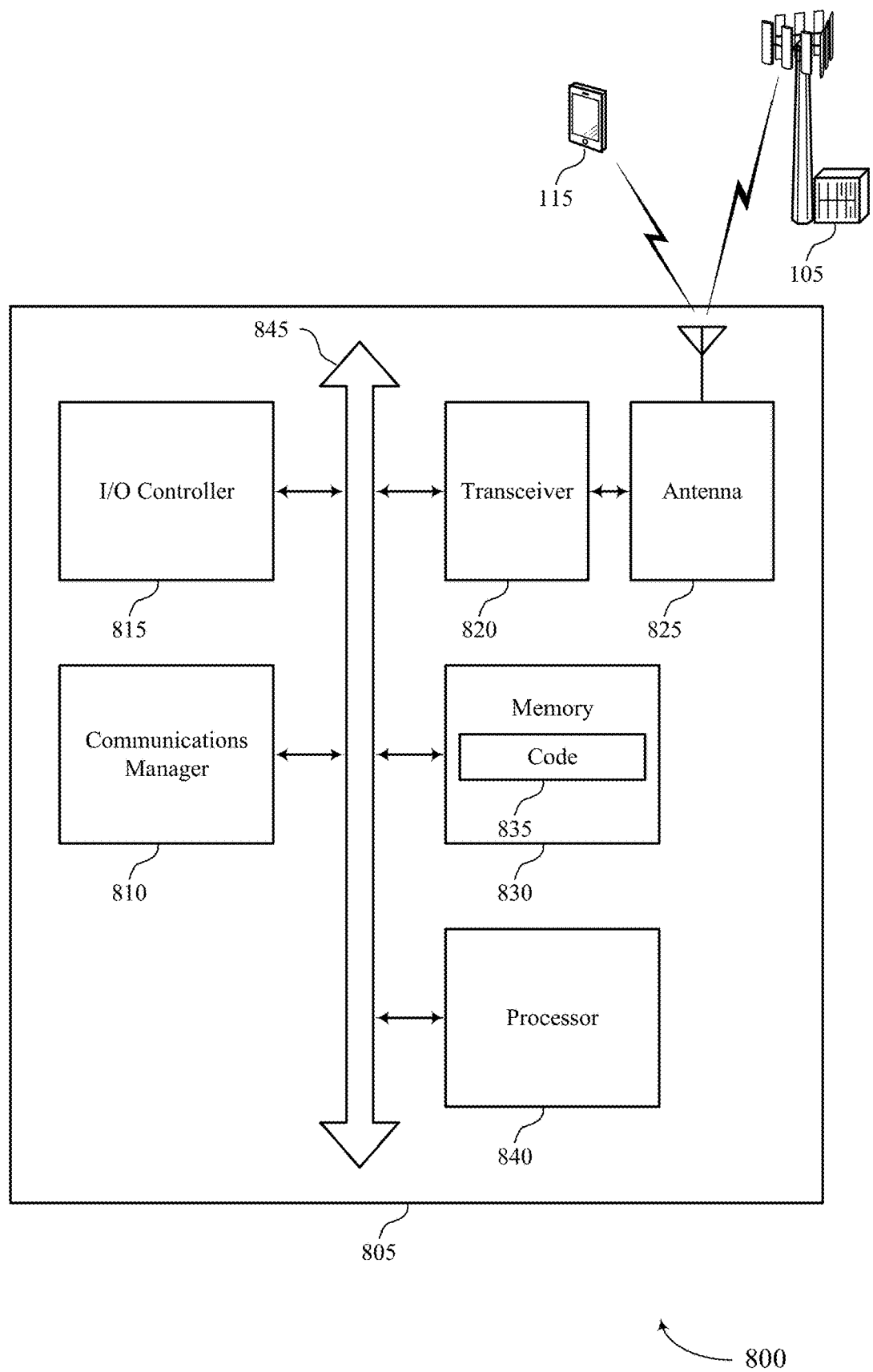
FIG. 8 shows a diagram of a system including a device that supports beam search for precoder for CSF in accordance with aspects of the present disclosure.

FIG. 8 shows a diagram of a system 800 including a device 805 that supports beam search for precoder for CSF in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a reference signal over a set of resources configured for CSI, perform a first beam search procedure on the received reference signal using a first subset of digital reception beams of the UE, perform a second beam search procedure using a second subset of digital reception beams of the UE based on the selected first digital reception beam, the second subset of digital reception beams including one or more reception beams corresponding to the selected first digital reception beam, select a first digital reception beam from the first subset based on a result of the first beam search procedure, and determine, based on the second beam search procedure, a PMI for the UE, the PMI associated with a reception beam of the one or more reception beams.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the device 805 may include a single antenna 825, or may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a Basic I/O System (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting beam search for precoder for CSF).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
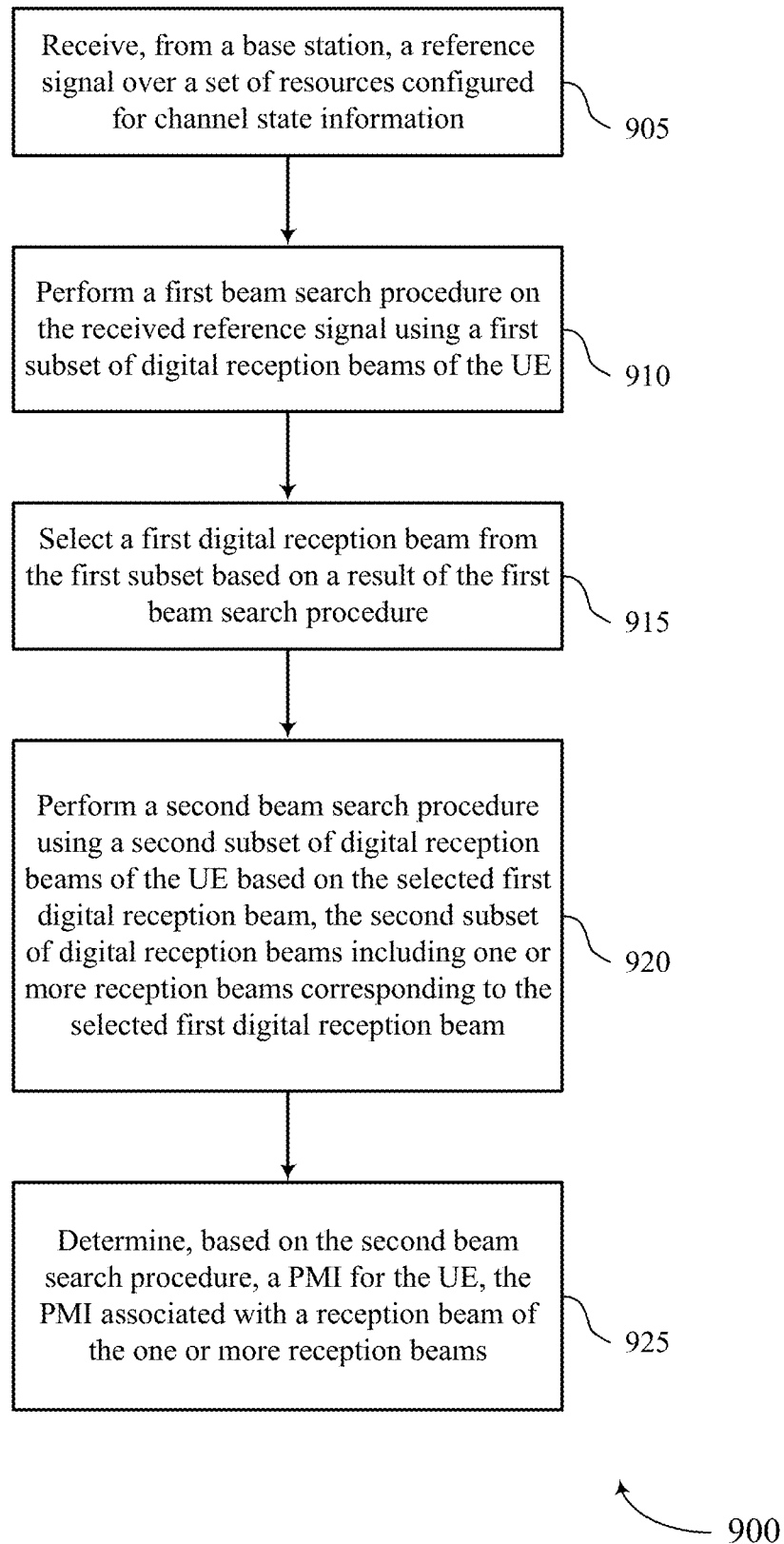
FIGS. 9 through 11 show flowcharts illustrating methods that support beam search for precoder for CSF in accordance with aspects of the present disclosure.

FIG. 9 shows a flowchart illustrating a method 900 that supports beam search for precoder for CSF in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the UE may receive, from a base station, a reference signal over a set of resources configured for CSI. The operations of 905 may be performed according to the methods described herein. In some examples, aspects of the operations of 905 may be performed by a reference signal receiver as described with reference to FIGS. 5 through 8.

At 910, the UE may perform a first beam search procedure on the received reference signal using a first subset of digital reception beams of the UE. The operations of 910 may be performed according to the methods described herein. In some examples, aspects of the operations of 910 may be performed by a beam search manager as described with reference to FIGS. 5 through 8.

At 915, the UE may select a first digital reception beam from the first subset based on a result of the first beam search procedure. The operations of 915 may be performed according to the methods described herein. In some examples, aspects of the operations of 915 may be performed by a reception beam selector as described with reference to FIGS. 5 through 8.

At 920, the UE may perform a second beam search procedure using a second subset of digital reception beams of the UE based on the selected first digital reception beam, the second subset of digital reception beams including one or more reception beams corresponding to the selected first digital reception beam. The operations of 920 may be performed according to the methods described herein. In some examples, aspects of the operations of 920 may be performed by a beam search manager as described with reference to FIGS. 5 through 8.

At 925, the UE may determine, based on the second beam search procedure, a PMI for the UE, the PMI associated with a reception beam of the one or more reception beams. The operations of 925 may be performed according to the methods described herein. In some examples, aspects of the operations of 925 may be performed by a PMI manager as described with reference to FIGS. 5 through 8.

Figure 10:
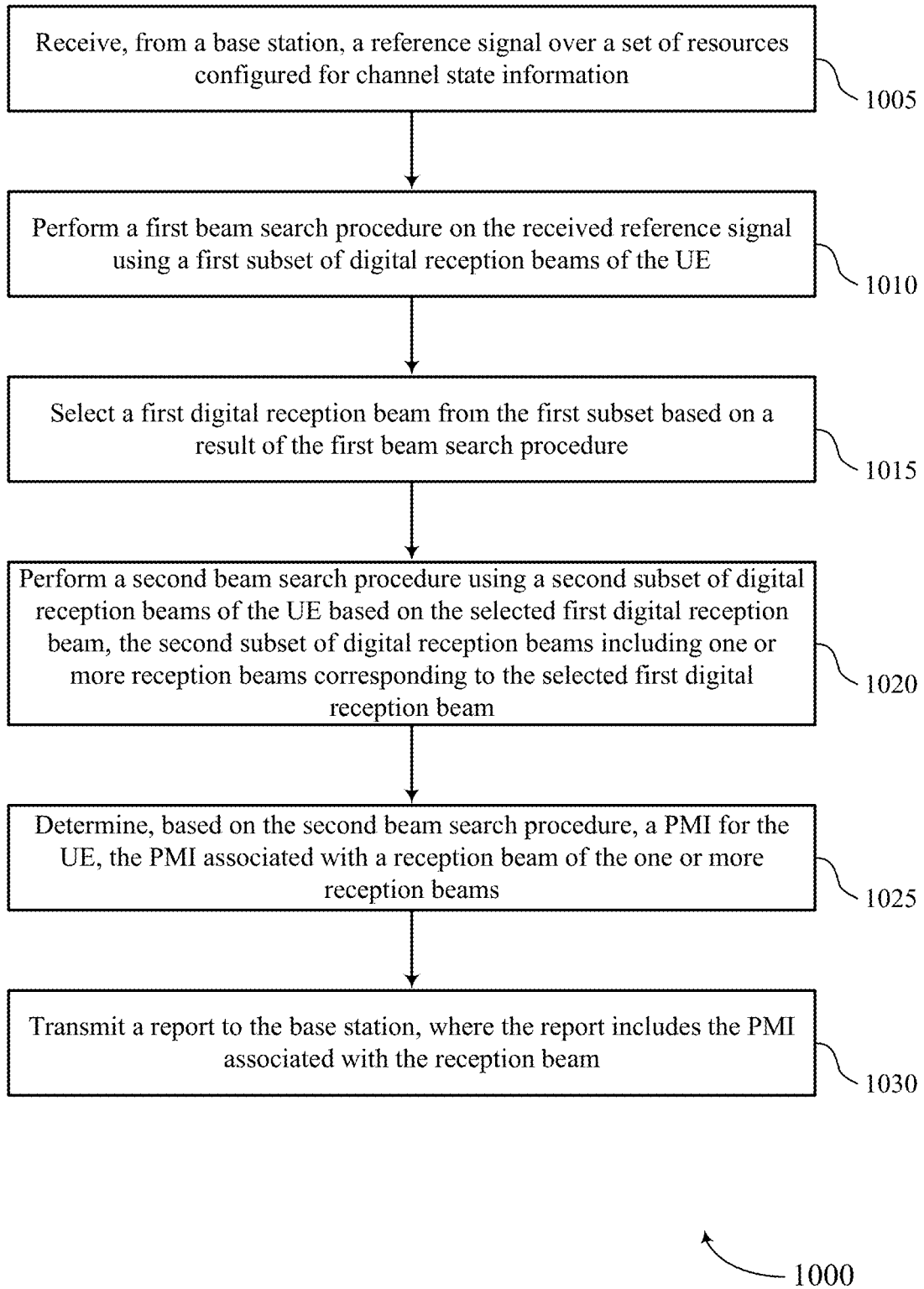

FIG. 10 shows a flowchart illustrating a method 1000 that supports beam search for precoder for CSF in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may receive, from a base station, a reference signal over a set of resources configured for CSI. The operations of 1005 may be performed according to the methods described herein. In some examples, aspects of the operations of 1005 may be performed by a reference signal receiver as described with reference to FIGS. 5 through 8.

At 1010, the UE may perform a first beam search procedure on the received reference signal using a first subset of digital reception beams of the UE. The operations of 1010 may be performed according to the methods described herein. In some examples, aspects of the operations of 1010 may be performed by a beam search manager as described with reference to FIGS. 5 through 8.

At 1015, the UE may select a first digital reception beam from the first subset based on a result of the first beam search procedure. The operations of 1015 may be performed according to the methods described herein. In some examples, aspects of the operations of 1015 may be performed by a reception beam selector as described with reference to FIGS. 5 through 8.

At 1020, the UE may perform a second beam search procedure using a second subset of digital reception beams of the UE based on the selected first digital reception beam, the second subset of digital reception beams including one or more reception beams corresponding to the selected first digital reception beam. The operations of 1020 may be performed according to the methods described herein. In some examples, aspects of the operations of 1020 may be performed by a beam search manager as described with reference to FIGS. 5 through 8.

At 1025, the UE may determine, based on the second beam search procedure, a PMI for the UE, the PMI associated with a reception beam of the one or more reception beams. The operations of 1025 may be performed according to the methods described herein. In some examples, aspects of the operations of 1025 may be performed by a PMI manager as described with reference to FIGS. 5 through 8.

At 1030, the UE may transmit a report to the base station, where the report includes the PMI associated with the reception beam. The operations of 1030 may be performed according to the methods described herein. In some examples, aspects of the operations of 1030 may be performed by a report transmitter as described with reference to FIGS. 5 through 8.

Figure 11:
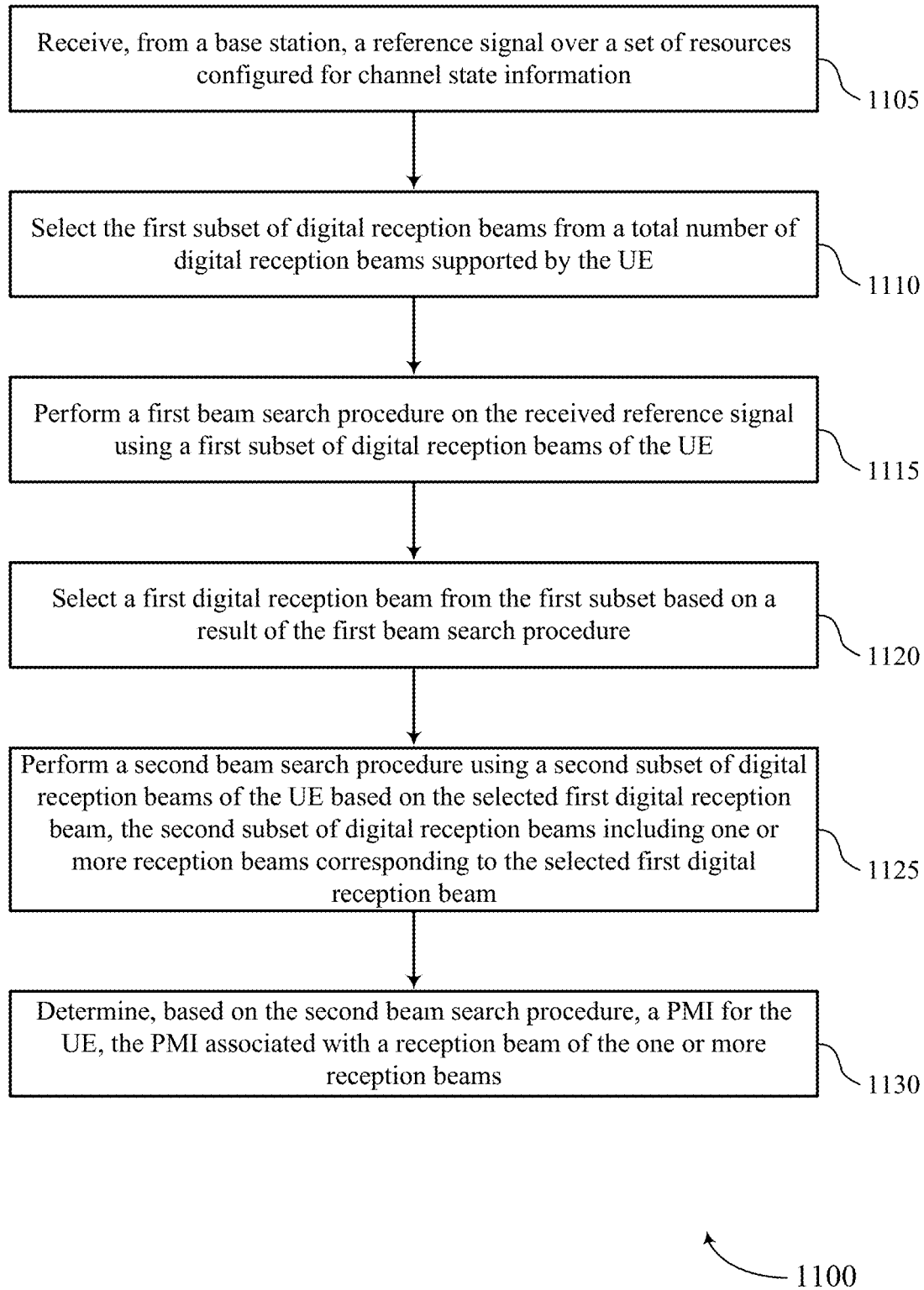

FIG. 11 shows a flowchart illustrating a method 1100 that supports beam search for precoder for CSF in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1105, the UE may receive, from a base station, a reference signal over a set of resources configured for CSI. The operations of 1105 may be performed according to the methods described herein. In some examples, aspects of the operations of 1105 may be performed by a reference signal receiver as described with reference to FIGS. 5 through 8.

At 1110, the UE may select the first subset of digital reception beams from a total number of digital reception beams supported by the UE. The operations of 1110 may be performed according to the methods described herein. In some examples, aspects of the operations of 1110 may be performed by a reception beam selector as described with reference to FIGS. 5 through 8.

At 1115, the UE may perform a first beam search procedure on the received reference signal using a first subset of digital reception beams of the UE. The operations of 1115 may be performed according to the methods described herein. In some examples, aspects of the operations of 1115 may be performed by a beam search manager as described with reference to FIGS. 5 through 8.

At 1120, the UE may select a first digital reception beam from the first subset based on a result of the first beam search procedure. The operations of 1120 may be performed according to the methods described herein. In some examples, aspects of the operations of 1120 may be performed by a reception beam selector as described with reference to FIGS. 5 through 8.

At 1125, the UE may perform a second beam search procedure using a second subset of digital reception beams of the UE based on the selected first digital reception beam, the second subset of digital reception beams including one or more reception beams corresponding to the selected first digital reception beam. The operations of 1125 may be performed according to the methods described herein. In some examples, aspects of the operations of 1125 may be performed by a beam search manager as described with reference to FIGS. 5 through 8.

At 1130, the UE may determine, based on the second beam search procedure, a PMI for the UE, the PMI associated with a reception beam of the one or more reception beams. The operations of 1130 may be performed according to the methods described herein. In some examples, aspects of the operations of 1130 may be performed by a PMI manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, from a base station, a reference signal over a set of resources configured for channel state information;
    performing a first beam search procedure on the received reference signal using a first subset of digital reception beams of the UE;
    selecting a first digital reception beam from the first subset of digital reception beams based at least in part on a result of the first beam search procedure;
    performing a second beam search procedure using a second subset of digital reception beams of the UE based at least in part on the selected first digital reception beam, the second subset of digital reception beams comprising one or more reception beams corresponding to the selected first digital reception beam; and
    determining, based at least in part on the second beam search procedure, a precoding matrix indicator for the UE, the precoding matrix indicator associated with a reception beam of the one or more reception beams.

2. The method of claim 1, further comprising:
transmitting a report to the base station, wherein the report comprises the precoding matrix indicator associated with the reception beam.

3. The method of claim 2, wherein the report is a channel state feedback report.

4. The method of claim 1, further comprising:
selecting the first subset of digital reception beams from a total number of digital reception beams supported by the UE.

5. The method of claim 1, further comprising:
selecting the second subset of digital reception beams from a total number of digital reception beams supported by the UE, wherein each of the second subset of digital reception beams are adjacent to the selected first digital reception beam.

6. The method of claim 1, wherein performing the first beam search procedure comprises:
measuring signal strength of the received reference signal for each of the first subset of digital reception beams, wherein the result of the first beam search procedure is based at least in part on the measured signal strength.

7. The method of claim 6, further comprising:
selecting the first digital reception beam based at least in part on the measured signal strength.

8. The method of claim 1, wherein performing the second beam search procedure comprises:
measuring signal strength of the second subset of digital reception beams; and
selecting the reception beam from the one or more reception beams based at least in part on the measured signal strength.

9. The method of claim 8, further comprising:
determining the precoding matrix indicator based at least in part on the reception beam.

10. The method of claim 1, wherein the first subset of digital reception beams and the second subset of digital reception beams comprise discrete Fourier transform (DFT) beams.

11. The method of claim 1, wherein the second subset of digital reception beams have consecutive beam indices.

12. The method of claim 1, wherein the reference signal is a channel state information reference signal.

13. The method of claim 1, further comprising:
selecting the first subset of digital reception beams or the second subset of digital reception beams based at least in part on a precoding codebook.

14. An apparatus for wireless communications at a user equipment (UE), comprising: a processor, memory coupled with the processor; and instructions stored in the memory and executable by the processor to cause the apparatus to:
receive, from a base station, a reference signal over a set of resources configured for channel state information;
perform a first beam search procedure on the received reference signal using a first subset of digital reception beams of the UE;
select a first digital reception beam from the first subset of digital reception beams based at least in part on a result of the first beam search procedure;
perform a second beam search procedure using a second subset of digital reception beams of the UE based at least in part on the selected first digital reception beam, the second subset of digital reception beams comprising one or more reception beams corresponding to the selected first digital reception beam; and
determine, based at least in part on the second beam search procedure, a precoding matrix indicator for the UE, the precoding matrix indicator associated with a reception beam of the one or more reception beams.

15. The apparatus of claim 14, wherein the instructions are further executable by the processor to cause the apparatus to:
transmit a report to the base station, wherein the report comprises the precoding matrix indicator associated with the reception beam.

16. The apparatus of claim 15, wherein the report is a channel state feedback report.

17. The apparatus of claim 14, wherein the instructions are further executable by the processor to cause the apparatus to:
select the first subset of digital reception beams from a total number of digital reception beams supported by the UE.

18. The apparatus of claim 14, wherein the instructions are further executable by the processor to cause the apparatus to:
select the second subset of digital reception beams from a total number of digital reception beams supported by the UE, wherein each of the second subset of digital reception beams are adjacent to the selected first digital reception beam.

19. The apparatus of claim 14, wherein the instructions to perform the first beam search procedure are executable by the processor to cause the apparatus to:
measure signal strength of the received reference signal for each of the first subset of digital reception beams, wherein the result of the first beam search procedure is based at least in part on the measured signal strength.

20. The apparatus of claim 19, wherein the instructions are further executable by the processor to cause the apparatus to:
select the first digital reception beam based at least in part on the measured signal strength.

21. The apparatus of claim 14, wherein the instructions to perform the second beam search procedure are executable by the processor to cause the apparatus to:
measure signal strength of the second subset of digital reception beams; and
select the reception beam from the one or more reception beams based at least in part on the measured signal strength.

22. The apparatus of claim 14, wherein the instructions are further executable by the processor to cause the apparatus to:
determine the precoding matrix indicator based at least in part on the reception beam.

23. The apparatus of claim 14, wherein the first subset of digital reception beams and the second subset of digital reception beams comprise discrete Fourier transform (DFT) beams.

24. The apparatus of claim 14, wherein the second subset of digital reception beams have consecutive beam indices.

25. The apparatus of claim 14, wherein the reference signal is a channel state information reference signal.

26. An apparatus for wireless communications at a user equipment (UE), comprising:
means for receiving, from a base station, a reference signal over a set of resources configured for channel state information; means for performing a first beam search procedure on the received reference signal using a first subset of digital reception beams of the UE;
means for selecting a first digital reception beam from the first subset of digital reception beams based at least in part on a result of the first beam search procedure;

means for performing a second beam search procedure using a second subset of digital reception beams of the UE based at least in part on the selected first digital reception beam, the second subset of digital reception beams comprising one or more reception beams corresponding to the selected first digital reception beam; and means for determining, based at least in part on the second beam search procedure, a precoding matrix indicator for the UE, the precoding matrix indicator associated with a reception beam of the one or more reception beams.

27. The apparatus of claim 26, further comprising:
means for transmitting a report to the base station, wherein the report comprises the precoding matrix indicator associated with the reception beam.

28. The apparatus of claim 27, wherein the report is a channel state feedback report.

29. The apparatus of claim 26, further comprising:
means for selecting the first subset of digital reception beams from a total number of digital reception beams supported by the UE.

30. A non-transitory computer-readable medium storing code for wireless communications at a user equipment (UE), the code comprising instructions executable by a processor to:

receive, from a base station, a reference signal over a set of resources configured for channel state information;

perform a first beam search procedure on the received reference signal using a first subset of digital reception beams of the UE;

select a first digital reception beam from the first subset of digital reception beams based at least in part on a result of the first beam search procedure;

perform a second beam search procedure using a second subset of digital reception beams of the UE based at least in part on the selected first digital reception beam, the second subset of digital reception beams comprising one or more reception beams corresponding to the selected first digital reception beam; and determine, based at least in part on the second beam search procedure, a precoding matrix indicator for the UE, the precoding matrix indicator associated with a reception beam of the one or more reception beams.

* * * * *